May 30, 1967 J. W. KELSO 3,322,094
INDICATOR MEANS
Original Filed Aug. 8, 1963 2 Sheets-Sheet 1
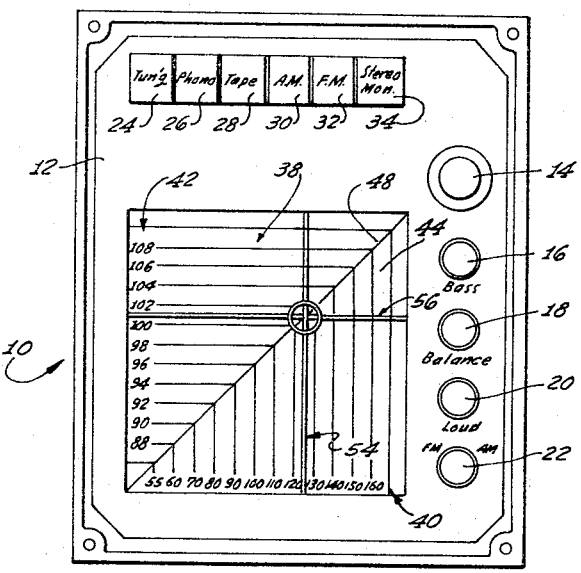
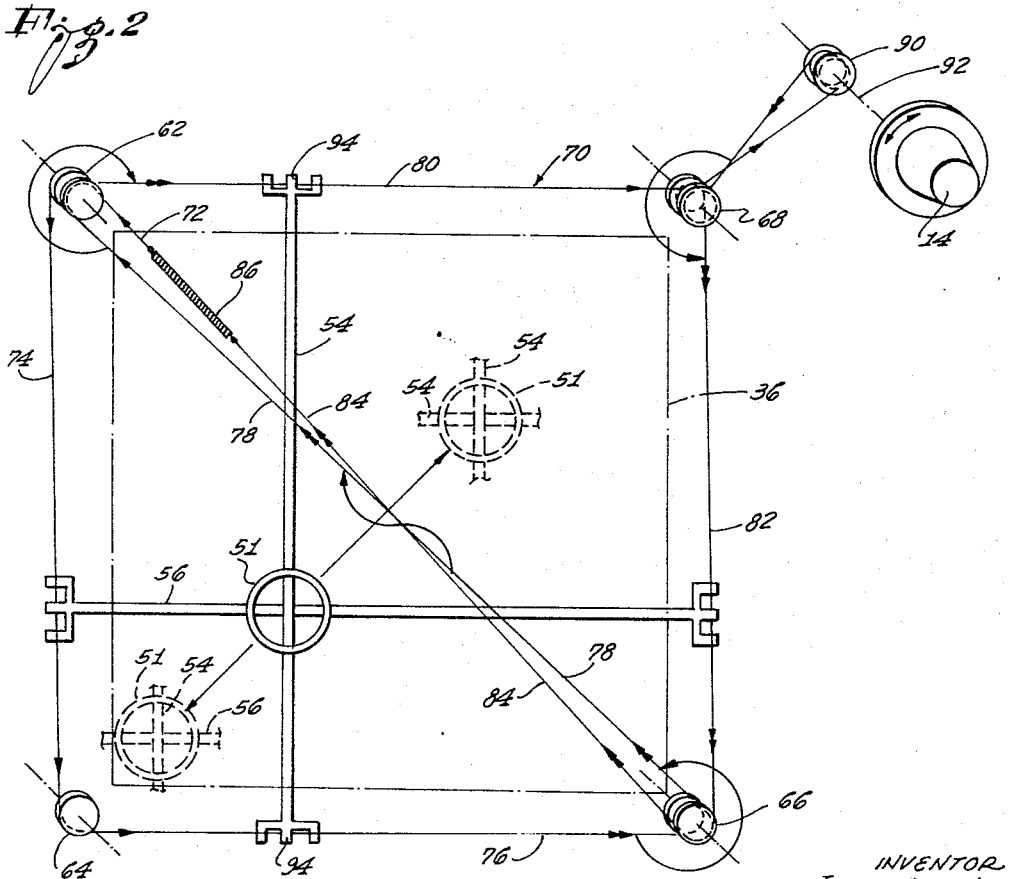
INVENTOR:
James W. Kelso
By Smyth, Roston & Pavitt
Attorneys May 30, 1967 J. W. KELSO 3,322,094
INDICATOR MEANS
Original Filed Aug. 8, 1963
2 Sheets-Sheet 2
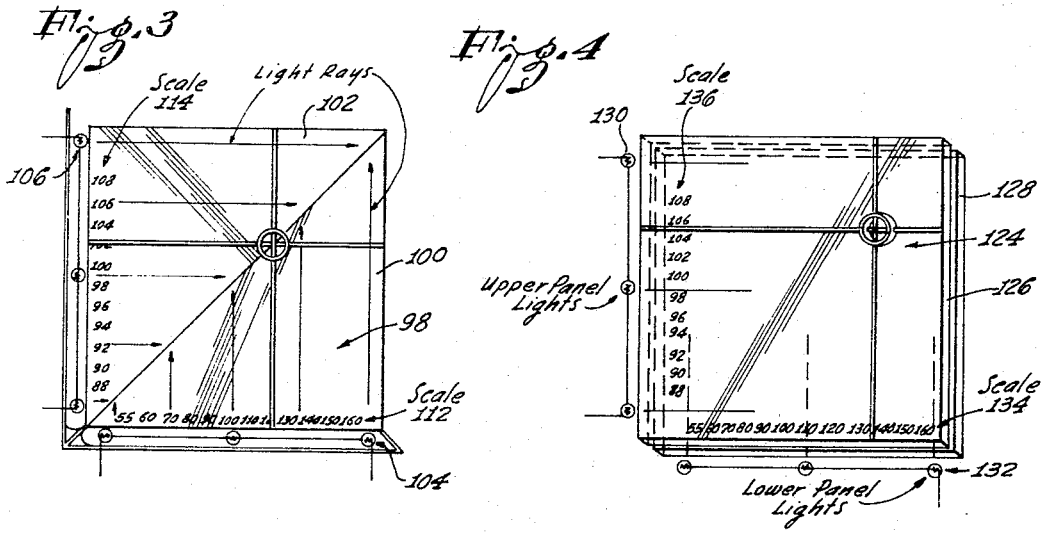
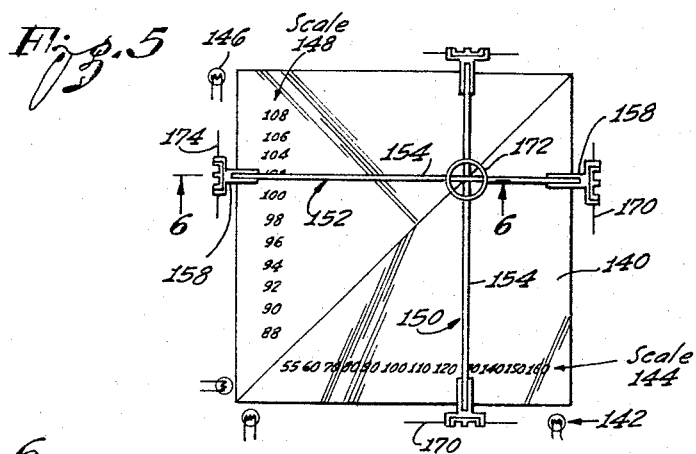
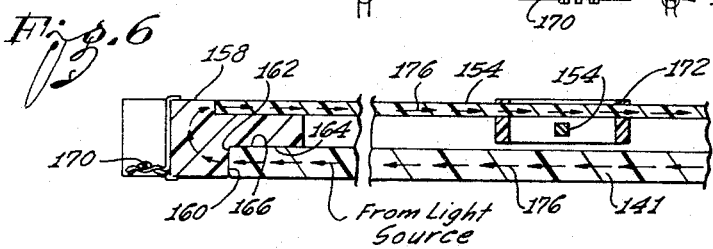
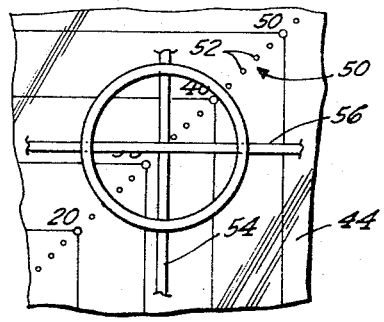
INVENTOR:
James W. Kelso
By Smyth, Roston & Pavitt
Attorneys

United States Patent Office 3,322,094
Patented May 30, 1967

3,322,094
INDICATOR MEANS
James W. Kelso, Pacific Palisades, Calif., assignor to Packard-Bell Electronics Corporation, Los Angeles, Calif., a corporation of California
Continuation of abandoned application Ser. No. 300,740, Aug. 8, 1963. This application Aug. 27, 1965, Ser. No. 491,475
27 Claims. (Cl. 116—124.4)

This is a continuation of my copending application Ser. No. 300,740, filed Aug. 8, 1963, entitled, "Indicator Means," now abandoned.

The present invention relates to indicator means, and more particularly to means effective to provide indications of the values of a plurality of separate functions.

In order to indicate the frequency a radio receiver is tuned to, a dial having one or more scales and a moveable indicator are normally provided. The indicator is interconnected with the tuning mechanism so as to sweep across the face of the dial and register with indicia in the scale that represents the particular frequency to which the receiver is tuned.

Although such a dial is effective to indicate the frequency that the receiver is tuned to, under some circumstances the dial and its indications may be confusing to the operator. For example, some radio receivers may be tunable to two separate frequency bands such as the standard broadcast or so-called "AM" band and a second broadcast or so-called "FM" band. In such radio receivers, it is desirable to employ a common dial for indicating both the frequencies in the AM band and the frequencies in the FM band.

Heretofore, in dials that are designed for this purpose, a first scale calibrated to represent the AM frequencies and a second scale calibrated to represent the FM frequencies are provided. These two scales have been superimposed or placed adjacent each other in a substantially parallel relationship. A single pointer or indicator is then provided that sweeps across the face of the dial to register with the indicia. Although such an arrangement is effective to provide an accurate indication of the frequency to which the receiver is tuned, it has been found that the operator very frequently becomes confused and reads the indicia on the wrong scale.

As an alternative to the foregoing arrangement, it has also been proposed to provide a separate moveable pointer or indicator for each scale. Thus, when the operator is tuning the receiver, only the pointer corresponding to the band being tuned will move. Although this may be effective in reducing the amount of confusion, when there is no motion of the indicators it is not readily apparent to which band or frequency the receiver is tuned. Also, such an arrangement requires complex and expensive drive means for moving the two indicators and/or complex and expensive means for switching from one band of operating to the other band.

It is now proposed to provide indicating means which will be effective to overcome the foregoing difficulties. More particularly, a tuning dial has been provided which may be used on a radio receiver tunable to a plurality of frequencies for indicating the particular frequency to which the receiver is tuned without producing confusion in the operation. In addition, the dial is extremely simple to manufacture and use. This is accomplished in one operative form of the present invention by providing a dial having an enlarged display area wherein the scale for one band extends across the display area in one direction while the scale for the other band extends across the display area at substantially right angles to the first scale. In addition, two separate movable pointers or indicators are provided which are disposed at substantially right angles to each other so as to sweep across the display area in orthogonal directions. The first of these pointers or indicators will register with only the first scale while moving toward and away from the second scale. At the same time the second of the pointers or indicators will register with only the second scale while moving toward and away from the first scale. As a consequence, the two scales and the two indicators are oriented at substantially right angles to each other. It has been found that the human eye will very readily associate a pointer or indicator disposed at one angle and moving in one direction with one function and the other pointer or indicator disposed at another angle and moving in another direction with the other function whereby confusion in the tuning operation has been substantially eliminated.

These and other features and advantages of the present invention will become readily apparent from the following detailed description of one embodiment thereof, particularly when taken in connection with the accompanying drawings wherein like reference numerals refer to like parts, and wherein:

FIGURE 1 is a view of dial means embodying one form of the present invention;

FIGURE 2 is a view of a portion of the operative elements contained within the dial means of FIGURE 1;

FIGURE 3 is a view of a portion of a dial means embodying a modified form of the present invention;

FIGURE 4 is a view of a portion of a dial means employing a further modified form of the present invention;

FIGURE 5 is a view of a portion of a dial means embodying a still further form of the present invention;

FIGURE 6 is an enlarged fragmentary cross-sectional view of the dial means of FIGURE 5 taken substantially along the plane of line 6—6 in FIGURE 5; and FIGURE 7 is a fragmentary view, on an enlarged scale, of a portion of the dial means of FIGURE 1.

Referring to the drawings in more detail, the present invention is particularly adapted to be embodied in an indicator or dial means 10 for indicating the values of a plurality of functions. Although the dial means 10 may be employed for any desired purpose in the present instance, it is particularly adapted to be utilized on a radio receiver for indicating the frequency to which the receiver is tuned. The dial means 10 is especially useful on radio receivers that are capable of being tuned to two separate frequency bands. By way of example, one of these frequency bands may extend from approximately 550 kilocycles to approximately 1,600 kilocycles so as to include the standard broadcast band wherein amplitude modulated or AM stations transmit. The other band may extend from approximately 88 megacycles to approximately 108 megacycles so as to include the band of frequencies assigned for broadcasting by the frequency modulated or FM stations.

More particularly, in the present instance, the dial means 10 is incorporated onto a mounting structure 12 of a size and shape that is especially arranged for mounting on the front of the radio receiver. If desired, suitable control knobs 14, 16, 18, 20 and 22 and indicator lights 24, 26, 28, 30, 32 and 34 may be included on the mounting structure 12 for use in regulating the various functions performed by the receiver and indicating the function being performed.

The first knob 14 may be interconnected with the tuning mechanism in the receiver so that the receiver may be tuned by rotating the knob 14. The selector knob 22 may be connected to a suitable switch for switching the receiver and the tuning mechanism between the AM and FM bands. The remaining knobs 16 to 20 may be provided for controlling other functions such as the loudness, etc. The various indicator lights 24 to 34 will become illuminated to indicate the functions that are being performed. For example, when the selector knob 22 is positioned to condition the receiver to operate in the AM mode the light 30 may be on while the indicator light 32 will turn on when the switch 22 is positioned for FM operation.

A substantially plane member 36 may be disposed on the mounting structure. This member may be slightly recessed from the plane of the structure so the exposed side of the member will form a display area 38. If desired, a transparent member or window may be provided over the display area 38 to protect it.

Two arrays of indicia or scales 40 and 42 may be provided on the plane member 36 or on the window so as to extend over the display area 38. Each of these scales corresponds to one of the bands that are to be tuned. The first of these scales 40 may extend across the display area in a first direction while the second of these scales 42 extends across the display area 38 in a second direction. This will result in the two scales 40 and 42 being angularly disposed with respect to each other.

In the present embodiment, the first scale 40 is disposed adjacent the lower edge of the display area 38 so as to extend horizontally thereacross (as seen in FIGURE 1). The various indicia in this scale 40 are numbered from 55 to 160 and are positioned to represent the frequencies of the stations in the AM or amplitude modulated band.

The second scale 42 is disposed adjacent the left edge of the display area so as to extend vertically thereacross (as seen in FIGURE 1). The various indicia in the second scale are numbered from 88 to 108 and are positioned to indicate the frequencies of the stations transmitting in the FM or frequency modulated band. It may thus be seen that the two arrays of indicia or scales 40 and 42 are disposed at substantially right angles to each other.

A set 44 of vertical lines may be provided on the display area 38 to register with the numbered indicia in the first scale 40. These lines will thus be positioned to correspond to the frequencies of the AM frequencies. These lines will be substantially normal to the lower edge and the scale 40. However, they are parallel to the vertical edge and will never cross the scale 42.

A second set 46 of horizontal lines may be provided on the display area 38 to register with the numbered indicia in the second scale 42. These lines will thus be positioned to correspond to the frequencies in the FM band. It should be noted that although these lines may be substantially normal to the vertical edge and the second scale 42 they are parallel to the first scale 40 and will never cross it.

The lines in each set 44 and 46 may be spaced at uniform increments and positioned so as to intersect each other along a substantially straight line 48. In the present embodiment, this line extends diagonally across the display area from one corner to the opposite corner. The line 48 may be either imaginary or actually marked on the display area 38. As seen in the enlarged view of FIGURE 7, if so desired each of the points at which the lines in the sets 44 and 46 intersect may be numbered to form a log scale 50. As will become apparent, this log scale 50 may be employed as a vernier or fine tuning scale for both the AM and FM scales 40 and 42. A plurality of uniformly spaced indicia such as the dots 52 may be provided between the intersections so as to more clearly define the diagonal line and to assist in interpolating between the numbered intersections.

In order to indicate the frequencies to which the receiver is tuned by the tuning knob 14, suitable indicating means such as a pair of indicators or pointers 54 and 56 may be interconnected with the knob 14 by a drive means. The pointers 54 and 56 may then be driven across the two scales 40 and 42 so as to register the indicia therein.

The first or AM indicator 54 may be mounted so as to be carried by the support structure 12 so as to extend across the display area 36. This indicator 54 is preferably substantially parallel to the vertical edges and normal to the top and bottom edges. The indicator 54 will thus be substantially parallel to FM scale 42 and will not register with the indicia therein. However, it will register with the indicia in the AM scale 40.

At the same time, the seconh indicator 56 may be mounted on the support structure so as to extend across the display area and register with the indicia in the FM scale 42. The second or FM indicator will thus be disposed substantially parallel to the top and bottom edges but normal to the vertical edges. As a consequence, indicator 56 will be parallel to the AM scale 40 and will not register with the indicia therein. However, it will be normal to the FM scale 42 and will register with the individual indicia in this scale.

Both of the indicators 54 and 56 are interconnected with the tuning knob 14 so that adjusting the tuning knob 14 will cause both of the indicators 54 and 56 to move simultaneously across the display area 38. Preferably, the two indicators 54 and 56 will be moved in translation across the display area 38 during a tuning operation. As a result, the two indicators 54 and 56 will always be at right angles to each other and parallel to the lines in the two sets 44 and 46.

In order to tune the receiver to the AM band or to the FM band, the selector knob 22 may be tuned respectively to the AM or FM positions. This will interconnect the various electrical components in the receiver so that it will operate in the AM or FM bands respectively. As a consequence, the single control knob 14 will tune the receiver to both the AM and FM bands and, at the same time, move both the AM and FM indicators or pointers 54 and 56 across the two scales 40 and 42.

If the two indicators 54 and 56 are translated, i.e., always maintained parallel to themselves and move across the display area at identical rates of speed, the two indicators 54 and 56 will always cross each other in substantial alignment with the diagonal line 48 extending across the display area 38. Thus, the vertical indicator 54 will indicate the AM frequency on both the horizontal scale 40 and the diagonal log scale 50. At the same time, the FM indicator 56 will indicate the FM frequency on both the vertical scale 42 and the diagonal log scale 50. Since the diagonal log scale 50 will have a greater length than either the vertical or horizontal scales 40 or 42, a somewhat greater degree of accuracy can be provided in the tuning operation. That is, the diagonal may be employed as a vernier or fine tuning scale. It is also possible, and where more than one band of calibrated stations must be given (i.e., short wave, marine or others) the diagonal line may also be used and accordingly indexed for this additional band. Thus, said dial using said indicator means can provide more than two bands; in fact, can provide five bands distinctly separated one from the other with these same advantages as mentioned.

To emphasize the point at which the indicators 54 and 56 cross each other, a ring 51 may be slidably disposed upon the two indicators 54 and 56. The present ring 51 includes a first pair of aligned openings through which the indicator member 54 will slide. A second pair of aligned openings 56 are provided in the ring 51 at substantially right angles to the first pair so that the indicators 54 can freely slide therethrough. It may thus be seen that the ring will always be concentric about the intersection of the indicators 54 and 56 and a "bull's eye" will be formed that is centered on the diagonal log scale 50.

As previously stated, in order to provide an accurate indication of the frequencies, it is desirable that the two indicators 54 and 56 move in pure translation. If the indicators 54 and 56 move in this manner, they will always be maintained substantially parallel to the lines in the respective sets 44 and 46 and any portion of the indicator may be used to accurately indicate the frequency. In order to accomplish this, it has been found desirable that drive means be connected to both ends of each indicator 54 and 56. This will insure the indicators being carried in a manner that will prevent "cocking" of the indicator.

Although there are numerous drive means of providing the foregoing form of translation, it has been found that the drive means 60 of FIGURE 2 is not only very simple and reliable, but is also capable of very accurately positioning the indicators. This drive means 60 includes suitable bearing means 62, 64, 66 and 68 adjacent each corner of the display area 38. Thus, if the display area 38 has a square or rectangular configuration similar to that shown, the bearing means 62 to 68 will be disposed in a corresponding square or rectangular configuration. The bearing means 62 to 68 may be of any desired variety such as a plurality of rotatable pulleys substantially as shown in the drawings or merely a smooth post such as the shank of a smooth metal rivet or similar member.

In order to carry the indicator members 54 and 56 by each end a suitable tension member may be provided on the bearing means 62 to 68 for moving therearound. By way of example, this tension member may be a flexible wire or string. Preferably, the member 70 will be very flexible but will have a minimum amount of stretch. The first end portion 72 of the tension member or string 70 may be disposed adjacent the center of the display area 38 with the end portion 70 extending diagonally across the display area to the first bearing member 62.

The second portion 74 of the string extends from the first bearing 62 to the second bearing 64. This portion is disposed substantially parallel to the edge of the display area 38 adjacent the FM scale 42. A third portion 76 of the string extends from the second bearing 64 to the third bearing 66. The third portion 76 will thus extend along one side of the display area 38 substantially parallel to the AM scale 40. A fourth portion 78 of the string 70 extends from the third bearing 66 diagonally across the display area 38 to the first bearing 62. It will thus be seen that the second portion 74, third portion 76 and fourth portion 78 form a right triangle with the hypotenuse disposed behind a diagonal of the display area 38.

A fifth portion 80 extends from the first bearing 62 to the fourth bearing 68. It will be noted that this fifth portion 80 will extend along the edge of the display area 38 opposite to the AM dial 40 and will be substantially parallel both to the AM scale 40 and to the third portion 76. A sixth portion 82 of the string 70 extends from the fourth bearing 68 to the third bearing 66. The sixth portion 82 is disposed adjacent the edge of the display area opposite to the FM scale 42. The sixth portion 82 will thus be substantially parallel to the second portion 74 and to the FM scale 42. The remaining end portion 84 may then extend from the third bearing 66 diagonally behind the display area 38 to the other end portion 72. The two end portions are secured together to form an endless loop. In order to maintain a substantially constant tension in the string 70 and to accept any stretching of the string 70, a suitable spring 86 may be provided between the two end portions 72 and 84.

The fifth portion 80, sixth portion 82 and seventh portion 84 will thus form a second right triangle that has its hypotenuse disposed behind the diagonal of the display area.

In order to drive the string or tension member 70 around the various bearing means 62 to 68, a portion 88 of the string 70 may be interconnected with a suitable drive pulley 90. The drive pulley 90 may be mounted on a shaft 92 that is interconnected with the tuning knob 14. It may thus be seen that by rotating the tuning knob 14, the entire tension member or string 70 will be moved around all of the bearing means 62 to 68.

When the tuning knob 14 is rotated so as to cause the string 70 to move in the direction of the arrows, it will be noted that both the second and sixth portions 74 and 82 will be moving downwardly (as seen in FIGURE 2) at substantially the same rate. At the same time, the third and fifth portions 76 and 80 will also be moving to the left (as seen in FIGURE 2) and at substantially the same rate. When the tuning knob 14 is rotated in the reverse direction, the string 70 will of course move in the opposite direction. However, both the second and sixth portions 74 and 82 will still be travelling in identical directions while both the third and fifth portions will still be travelling in identical directions.

The first indicator 54 has a pair of keepers 94 on the opposite ends thereof for carrying the indicator 54. Each of the keepers 94 includes a plurality of fingers that intermesh with the string 70 so as to be locked thereon. The keepers 94 are connected to the third and fifth portions 76 and 80. Since these portions 76 and 80 always travel in the same directions, the indicator 54 will always move in translation. The second indicator 56 includes a pair of keepers 96 that are secured to the second and sixth portions 74 and 82. Since these portions 74 and 82 always move in the same directions, the indicator 56 will also be translated across the display area 38.

It may thus be seen that both indicators 54 and 56 will move together in translation at the same rate. Accordingly, they will always cross each other in alignment with the diagonal line or log scale 50.

As an alternative, the embodiment of FIGURE 3 may be employed. This embodiment is similar to the first embodiment in that it may be mounted on a support structure similar to the structure 12 in the first embodiment. However, the plane member 36 forming the display area 38 in the first embodiment is replaced in this present embodiment. More particularly, the display area 98 is formed by two separate but substantially identical panel members 100 and 102. These panel members 100 and 102 are adapted to be secured to the support structure in a substantially common plane. Although the members 100 and 102 may be of any size and shape, in the present instance they comprise 45° right triangles which abut each other along their hypothesis. This will insure the display area 98 being substantially square.

Each of these members 100 and 102 may comprise a transparent material such as glass or a plastic whereby the members may be "edge lighted" and the light may travel therethrough. More particularly, any light that is inside of the members 100 and 102 and travelling approximately parallel to the flat faces will be confined inside of the members and will not emerge from either of the faces of the member 100 and 102. Instead, such light will be diffused substantially uniformly throughout the members. As a consequence, even though there may be substantial amounts of light inside of the panel member, the display area 98 will appear to be dark to a person looking at the area 98.

In order to supply light to these panel members 100 and 102, suitable edge lighting means may be provided. In the present instance, this edge lighting means includes separate sets 104 and 106 of lamps for each of the members. Each of the sets 104 and 106 comprises a plurality of small incandescent lamps which are mounted immediately adjacent to at least one edge of the panel member for directing light through the edges and into the members.

The diagonal or abutting edges of the two members 100 and 102 are preferably isolated from each other so that the light diffused throughout one member will not be coupled into the opposite member. This may be accomplished by several means such as separating the edges or painting the edges. In the present instance, an opaque strip 110 is disposed between the edges so as to prevent the passage of light between the two members 100 and 102. Also, the strip 110 may extend beyond the corners of the panel members to prevent the lamp at the end of one set projecting light into the other panel members. The lamps in the two sets 104 and 106 may be separately interconnected with means that are responsive to the mode the receiver is operating in. For example, the lamps in the first set 104 may be interconnected with the AM or amplitude modulated side of the selector switch controlled by the knob 22. More particularly, they may be connected to the indicator lamp 30 so as to operate simultaneously therewith.

The lamps in the second set 106 may be interconnected with the FM or frequency modulated side of the selector switch, i.e. to the indicator light 32. As a consequence, when the mode selector switch 22 is set to place the receiver in condition to operate in the amplitude modulation mode, all of the lamps in the first set 104 will be energized but the lights in the second set 106 will be extinguished. Thus, when the reciver is operating in the amplitude modulation mode, the first panel member 100 will be illuminated internally but the second panel member 106 will not have any light present therein.

Conversely, when the receiver is operating in the frequency modulation mode, the first member 104 will be dark and the second member 106 will be highly illuminated internally.

To facilitate indicating the frequency to which the receiver is being tuned, a first or amplitude modulation scale 112 may be provided in the first member 100 while a second or frequency modulation scale 114 may be provided in the second member 102, the indicia in the first scale 112 may be numbered and positioned to correspond to the frequencies in the amplitude modulation or AM band while the indicia in the second scale 114 may be positioned and numbered to correspond to the frequencies in the frequency modulation or FM band.

These indicia are constructed and arranged so that in the absence of light being diffused throughout its member, the indicia will be relatively inconspicuous. However, if a set of lamps are directing large amounts of light into the member, the indicia will be coupled to the light and will radiate a substantial amount of light. This light will make the indicia be bright and easily read. It will also make the indicia many times more conspicuous than the dark indicia.

It may thus be seen that when the selector switch 22 is in the AM position, the lamps in the first set 104 will be lit and the indicia in the AM scale 112 will appear as easily read luminous characters that are conspicuous to the human eye. The indicia in the FM scale 114 will be dark and not readily apparent. Conversely, when the selector switch 22 is in the FM position, the first set 104 of lamps will be dark and the second set 106 illuminated. This, in turn, will make the indicia in the FM scale 114 bright and conspicuous while the indicia in the AM scale 112 are dark.

In order to indicate the particular frequency to which the receiver is tuned, a pair of indicators 116 and 118 may be mounted adjacent the two members 100 and 102 so as to register with the indicia in the two scales 112 and 114. These indicators 116 and 118 may be mounted on a drive mechanism and interconnected with the tuning knob 14 in substantially the same manner as in the first embodiment. As a consequence, when the receiver is being tuned, the two indicators 116 and 118 will simultaneously be translated across the display area 98 formed by the surfaces of the two panel members 100 and 102. As the two indicators 116 and 118 move, they will always cross each other in substantial alignment with the diagonal formed by the abutted edges of the two members 100 and 102. In addition, the first indicator 116 will register with the individual indicia in the AM scale 112 and while the second indicator 118 will register with the FM scale 114.

In order to employ the present embodiment to indicate the frequency to which the receiver is tuned, the selector switch 22 is positioned to condition the receiver to operate in the desired mode, for example to receive the signals in the AM band. This will be effective to cause the lamps in the first set 104 to be turned on and the lamps in the second set to be off. Thus, only the scale 112 corresponds to the AM frequencies will be illuminated and highly conspicuous. If the selector switch 22 is placed in the FM position, the lamps in the second set 106 will be tuned on and the indicia in the FM scale will be very conspicuous. As a consequence, in addition to being disposed at right angles to each other, the two scales will have extremely contrasting amounts of illumination that will make it readily apparent to the operator which mode the receiver is operating in and which scale is effective to represent the band being tuned.

As an alternative to the foregoing embodiment, the embodiment of FIGURE 4 may be employed. This embodiment is substantially identical to the preceding embodiment in that it is also effective to provide two separate scales for indicating AM and the FM bands. However, the display area 124 is not formed by a pair of triangular members disposed in a common plane. Instead, a pair of panel members 126 and 128 having substantially the same shape as the display area 124 are provided for being secured to the supporting structure. The two members 126 and 128 may be stacked one on top of the other in substantial alignment.

Both of these panel members 126 and 128 may consist of an optically transparent material such as glass or a clear plastic. This will permit an operator looking through the front member 126 and into the second member 128. In addition the material is suitable for so-called edge light wherein a large amount of light may be diffused throughout the member without emerging from the plane surface formed by the faces on the opposite sides of the panel members 126 and 128.

In order to illuminate the two members, a first set of lights may extend along one edge of one member 126 and be interconnected with the selector switch 22 so as to be lit only when the switch is in a position such as AM. At the same time, a second set 132 of lights may be provided along the edge of the second member 128. The lamps in the second set 132 may be interconnected with the selector switch 22 so as to be energized only when the receiver is operating in the FM mode. These two members are preferably separated by a relatively thin air space or otherwise isolated from each other so that the light from one set of lamps will not be coupled into the other member.

In order to assist in indicating the particular frequency to which the receiver is being tuned, a first or AM scale 134 may be provided along one edge of the first member 126. The individual indicia in this scale may be positioned to correspond to the various frequencies in the AM band to be received and are recessed into the member so as to be coupled to the light within the member 126. As a result, when the first set 130 of lamps are on, the indicia will become luminous.

At the same time, a second or FM scale 136 may be provided in the second member 128 at substantially right angles to the first scale 134. The indicia in this scale are also etched or otherwise recessed into the panel 128 so as to be coupled to the light therein and are positioned to correspond to the various frequencies in the FM band.

In order to indicate the particular frequency to which the receiver is tuned, a pair of indicators 138 and 140 may be provided which are interconnected with the tuning knob 14 in substantially the same manner as in the preceding embodiments. Thus, these indicators 138 and 140 will move at right angles to each other and sweep across the two scales.

It may thus be seen that when the selector switch 14 is in the AM position to put the receiver in the AM mode, the first set of lamps 13 extending along the edge of the first member 126 will be lit so that the characters will become luminous and very conspicuous to the human eye. Conversely, when the selector switch 14 is in the FM position, only the lamps in the second set 132 of lights will be illuminated so as to make the second or FM scale 136 luminous while the first or AM scale remains dark.

As a further alternative, the embodiment of FIGURES 5 and 6 may be employed. This embodiment employs a pair of edge-lighted panel members 139 and 141 which may be triangular members arranged in a common plane similar to the embodiment of FIGURE 3. However, a pair of edge-lighted panel members 139 and 141 stacked on top of each other similar to FIGURE 4 may be employed. In addition, a first set of lamps 142 may be provided along the edge of one of the first members so as to be illuminated only when the receiver is operating in the AM mode. An AM scale 144 may be provided on the member 139 so as to extend along one edge of the member. The indicia in this scale 144 are adapted to be coupled to the light produced in the member by the lamps 142. Thus, when the receiver is operating in the AM mode, the indicia in the AM scale 144 will glow conspicuously.

In addition, a second set 146 of lamps may be provided adjacent the second member 141 for directing light into the member 141. The lamps in this set are also connected to the selector switch 22 whereby the second member 141 will be edge-lighted when the receiver is operating in the FM mode. An FM scale 148 may be provided on the second member at substantially right angles to the first or AM scale so as to be coupled so the light produced in the second member by the second set of lamps. Thus, when the receiver is operating in the FM mode, the indicia in the FM scale 148 will glow conspicuously. This embodiment will thus have two scales 144 and 148 that are disposed at right angles to each other and will luminesce alternately depending upon the mode of operation of the receiver.

In order to indicate the particular frequency to which the receiver is tuned, a pair of orthogonal indicators 150 and 152 may be provided. Each of these indicators 150 and 152 may include an elongated member 154 which is adapted to extend across the display area 156 formed by the panel members 139 and 141.

A slide 158 is secured to each end of the elongated member 154. Each of the slide members 158 includes a shoulder 160 which fits against the edge 162 of a panel member and a face 164 that extends over the border 166 of the panel member. This will insure the elongated member being disposed parallel to the plane of the panel member as the slides 158 move along the edges of the member.

Each of the slides 158 may have a keeper which is adapted to be connected to a suitable tension member 170 for driving the indicators 150 and 152. By way of example, this tension member may be a string that is wound around bearing means such as 62 to 68 at the corners of the display area and interconnected with a tuning knob 14 in substantially the same manner as illustrated in FIGURE 2.

It will thus be seen that actuation of the tuning knob 14 will be effective to cause the two indicators 150 and 152 to be translated across the display area 156 and register with the indicia in the two scales 144 and 148. A ring 172 may be slidably disposed on the two members 154 adjacent the point at which they intersect to assist in maintaining the intersection in alignment with a diagonal extending across the display area 156.

The slide member 158 may consist of an optically transparent material such as a clear glass or plastic suitable for being edge illuminated. The portions of the panel members 140 and 141 upon which the slide members 158 move, i.e., the edge 162 and/or the border 166, may be frosted by sand blasting, etc., so that the light diffused through the panel member 139 and 141 may escape. The escaping light will enter through the face and/or shoulder 164 into the slide member 158. Each of the elongated members 154 may also consist of an optically transparent material suitable for being edge illuminated. The ends of the elongated members 154 are secured to the slides 158 so that the light in the slide 158 will be coupled into the elongated member 154. As a result, the light may follow a path such as indicated generally by the arrows 176 and travel the length of the elongated member 154. The elongated member 154 may also have its surface frosted by sand blasting, etc. whereby the light in that portion will be radiated substantially uniformly from the surface of the member 154. When illuminated in this manner, the elongated member 154 will appear as a thin luminous line.

In order to employ this embodiment, to tune the receiver, the selector switch 22 will be positioned to condition the receiver to operate in a mode for receiving AM signals or to operate in a mode for receiving FM signals. If the switch 22 is in the AM mode, the first set 142 of lamps will be illuminated. As a consequence, light will be present in the first member 139 and will result in the indicia in the AM scale 144 being illuminated. At the same time, light will be coupled into the slide 158. This light will then travel into the elongated member 154 and provide an elongated luminous line that extends across the display area and registers with the indicia in the AM scale 144. The operator will observe a substantially horizontal row of luminous indicia representing the frequency in the AM band and a substantially vertical luminous line which will register with these indicia. As a result, there will be no confusion as to the fact that the receiver is operating in the AM mode and which scale represents the AM frequency.

When the selector switch 22 is moved to the FM position so as to condition the receiver to operate in a frequency modulation mode, the first set 142 of lights will be extinguished and the second set 146 will be illuminated. The second set 146 of lights will thus cause the indicia in the vertical FM scale 148 to be luminous and the second indicator 152 to also provide a horizontal luminous line.

It will thus be seen in addition to being much more conspicuous because of its luminousity, the FM indicators that will be displayed will be oriented entirely different from the AM display. The two displays which are thus presented to the operator will be of obviously different appearance. As a consequence, it will be very readily apparent to the operator which mode the receiver is operating in and which of the scales and indicators represents the band of frequencies that the receiver is tuned to.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. Indicator means for providing on a display area indications in a first direction of a first parameter and for providing on the display area indications in a second direction substantially perpendicular to the first direction, including the combination of:

means including a first array of indicia disposed in the first direction, means including a second array of indicia disposed with respect to said first array in the second direction substantially perpendicular to the first direction, a first indicator positioned adjacent said first array of indicia in a direction substantially perpendicular to the first array of indicia, said indicator being movable along said first array of indicia to individually register with the indicia in said first array, a second indicator positioned adjacent said second array of indicia in a direction substantially perpendicular to the second array of indicia, said second indicator being movable along said second array of indicia to individually register with the indicia in said second array, a plurality of bearing means each disposed at a different corner of the display area, and means connected to the first and second indicators and extending around the bearing means in the plurality and extending diagonally between particular bearing means in the plurality for simultaneously obtaining a movement in the first direction of the first indicator along the first array of indicia and a movement in the second direction of the second indicator along the second array of indicia.

2. Indicator means for providing indications on a display area in a first direction of a first parameter and for providing on the display area indications in a second direction transverse to the first direction, including the combination of:

indicating means including a first array of indicia disposed in the first direction and including a second array of indicia disposed in the second direction transverse to the first direction, a first indicator positioned adjacent the indicia in said first array in a direction transverse to the indicia in the first array to register only with the individual indicia in said first array, means connected to the indicating means for retaining the first indicator on the indicating means and for obtaining a movement of said first indicator in the first direction along said first array, a second indicator positioned adjacent the indicia in said second array in a direction transverse to the indicia in the second array to register only with the individual indicia in said second array, means connected to the indicating means for retaining the second indicator on the indicating means and for obtaining a movement of said second indicator in the second direction along said second array, a plurality of bearing means each disposed at an individual corner of the display area, and means interconnected with said first and second means and extending between a pair of diagonally opposite corners in the array for simultaneously moving said first indicator along said first array of indicia and said second indicator along said second array of indicia on a controlled basis.

3. Indicator means, including the combination of:

a display area having first and second sides in transverse relationship to each other, there being a row of indicia extending along the first side of said display area, there being a column of indicia transversely disposed with respect to said row of indicia and extending along the second side of said display area, a first indicator disposed at an angle to said row of indicia to register with the individual indicia in said row, said indicator being movably mounted for traveling across said display area and along said row of indicia, a second indicator disposed at an angle to said column of indicia and to said first indicator to register with the individual indicia in said column, said second indicator being movably mounted for traveling across said display area and along said column of indicia, and drive means including a tension member interconnected with said first and second indicators and disposed in a closed loop and extending diagonally across the display area between a pair of diagonally opposite corners in the display area for synchronously moving said first indicator along said row and said second indicator along said column.

4. Indicator means for indicating a first function or a second function different from the first function, including the combination of:

a display area having first and second sides in transverse relationship to each other, there being a row of indicia extending along the first side of said display area, each of the indicia in said row being positioned to represent a value in the first function, there being a column of indicia angularly disposed with respect to said row of indicia and extending along the second side of said display area, each of the indicia in said column being positioned to represent a value in the second function, a first indicator disposed at an angle to said row of indicia and substantially parallel to said column of indicia, means for movably mounting said indicator for traveling across said display area toward and away from said column of indicia to register with the individual indicia in said row and indicate the value of said first function, a second indicator disposed at an angle to said column of indicia and substantially parallel to said row of indicia, second means for movably mounting said second indicator for traveling across said display area toward and away from said row of indicia to register with the individual indicia in said column and indicate the value of said second function, and drive means including a tension member extending only a single time along each of the sides defining the display area and interconnected with said first and second means for moving said first indicator across said display area substantially parallel to said column of indications and along said row of indicia in response to the value of said first function and for moving said second indicator, synchronously with the movement of said first indicator, across said display area substantially parallel to said row of indicia and along said column of indicia in response to the value of said second function.

5. Indicator means for indicating a first function or a second function different from the first function, including the combination of:

a display area having first and second sides in transverse relationship to each other, there being a row of indicia extending along the first side of said display area, each of the indicia in said row being positioned to represent the values of the first function, there being a column of indicia angularly disposed with respect to said row of indicia and extending along the second side of said display area, each of the indicia in said column being positioned to represent the values of the second function, a first indicator disposed in contiguous relationship to the indicia in the row for movement along the row of indicia, means movably supporting said first indicator for movement across said display area along said row of indicia to register with the individual indicia in said row, a second indicator disposed in contiguous relationship to the indicia in said column to register with the individual incidia in said column, said first and second indicators being positioned to cross each other in said display area, means movably supporting said second indicator for movement across said display area along said column of indicia, drive means including a tension member interconnected with said first and second means and extending only a single time along each of the sides defining the display area for simultaneously moving said first indicator and said second indicator respectively along said row of indicia and said column of indicia whereby said indicators will always cross each other in substantial alignment along a diagonal joining the first and second sides of the display area, and means disposed upon at least one of said first and second indicators adjacent the position of crossing of the first and second indicators to maintain such position of crossing.

6. Indicator means for indicating a first function or a second function different from the first function, including the combination of:

a display area having first and second sides disposed in transverse relationship to each other and having third and fourth sides respectively in substantially parallel relationship to the first and second sides, there being a row of indicia extending along the first said of said display area, each of the indicia in said row being positioned to represent individual values in the first function, there being a column of indicia extending along the second side of said display area at substantially right angles to said row of indicia, each of the indicia in said column being positioned to represent individual values in the second function, a first elongated indicator extending across said display area between the first and third sides and in contiguous relationship to the individual indicia in said row, means secured to the ends of said indicator adjacent said first and third sides to movably support said indicator for translation across said display area to register with the indicia in said row, a second elongated indicator extending across said display area between the second and fourth sides and in contiguous relationship to the individual indicia in said column, means secured to the ends of said second indicator adjacent said second and fourth sides to movably support said second indicator for translation across said display area to register with the indicia in said column, and drive means including a tension member interconnected with said first and second indicators and having at least one portion extending between the position common to the first and second sides and the position common to the third and fourth sides for simultaneously translating said first indicator and second second indicator across said display area to provide for a synchronous movement of the first and second indicators respectively along the indicia in said row and the indicia in said column and to provide for a crossing of said indicators in substantial alignment with a diagonal extending across said display area between the position common to the third and second sides and the position common to the first and fourth sides.

7. Indicator means for indicating a first function or a second function different from the first function, including the combination of:

a substantially rectangular display area having first and third sides in substantially parallel relationship to each other and having second and fourth sides in substantially parallel relationship to each other and in substantially perpendicular relationship to the first and third sides, there being a row of indicia extending along the first said of said display area, each of the indicia in said row being positioned to represent individual values in the first function, there being a column of indicia extending along the second side of said display area, each of the indicia in said column being positioned to represent individual values in the second function, a first elongated indicator extending across said display area between said first side and said third side and in substantially perpendicular relationship to said second and fourth sides to register with the individual indicia in said row, first means adjacent said first and third sides and secured to the opposite ends of said indicator to movably support said indicator for translation across said display area and along said row of indicia to register with the indicia in said row, a second elongated indicator extending across said display area between said second side and the fourth side and in substantially perpendicular relationship to said first and third sides to register with the individual indicia in said column, second means secured to the opposite ends of said second indicator adjacent said second and fourth sides to movably support said second indicator for translation across said display area and along said column of indicia to register with the indicia in said column, drive means including a tension member interconnected with said first means and said second means and extending only a single time along each of the first, second, third and fourth sides and extending diagonally across the display area between the position common to the first and second sides and the position common to the third and fourth sides for simultaneously translating both the first indicator and the second indicator across said display area to obtain a registry of said indicators with the indicia in said row and the indicia in said column and to obtain a crossing of said indicators in substantial alignment with a straight line extending diagonally across said display area between the position common to the second and third sides and the position common to the first and fourth sides, and an indicator member slidably disposed upon both of said indicators adjacent the position of crossing of said first and second indicators for defining said crossing of said first and second indicators in substantial alignment with said diagonal line.

8. Indicator means of the class described, including the combination of:

indicating means including a first array of indicia, there being on said indicating means a second array of indicia transversely disposed with respect to said first array of indicia, a first indicator positioned adjacent said first array of indicia to register only with the individual indicia in said array, first means for supporting said first indicator for translation along said first array of indicia, a second indicator positioned adjacent said second array of indicia to register only with the individual indicia in said second array, second mean for supporting said second indicator for translation along said second array of indicia in intersecting relationship with said first indicator, third means interconnected with said first and second indicators and having a diagonal portion and only a single portion along the first and second array of indicia for simultaneously translating said indicators along their associated arrays of indicia to obtain the intersection of said indicators along a diagonal line crossing the ends of said first and second arrays, and an indicator member slidably disposed on said indicators for defining said crossing of said indicators at said diagonal line.

9. In combination for use with a display area having corners defining the boundaries of the display area, a plurality of bearing means individually disposed adjacent the corners of said display area, a flexible tension member movably disposed on said bearing means to define a closed loop, the flexible tension member extending only once between each pair of adjacent bearing means and extending between the bearing means diagonally disposed in the plurality to obtain displacements of the tension member at opposite ends of the display member in the same direction through the same increments of distance, an indicator member mounted on the tension member for displacement with the tension member, and means operatively coupled to the tension member for obtaining displacements of the tension member diagonally across the display area.

10. In combination for use with a display area having first and second opposite sides for indicating a first function or a second function different from the first function,
a first pair of bearing means disposed substantially along substantially the first line,
a second pair of bearing means disposed along substantially the second line,
a flexible tension member movably disposed on said bearing means and extending only once between said bearing means along the first line and said bearing means along the second line and diagonally between the bearing means at the extremities of the first and second lines in a particular relationship to obtain a movement of the tension means in a first direction and through equal increments of distance along the first and second lines,
a first indicator coupled to the tension means along the first line for movement with the tension means along the second line,
a second indicator coupled to the tension means along the second line for movement with the tension means along the first line,
means disposed relative to the indicator for providing first indicia along a particular one of the first and second lines as to the values of the first function in accordance with the movements of the first indicator along the line and for providing second indicia along the second line as to the values of the second function in accordance with the movements of the second indicator in the second direction, and
means coupled to the tension member for obtaining displacements of the tension means along the first and second lines and diagonally to provide for movement of the first indicator along the first indicia and movement of the second indicator along the second indicia.

11. In combination for translating an indicator across a display area:
a first pair of bearing means disposed in a line extending along one side of said display area,
a second pair of bearing means disposed in a line extending along an opposite side of said display area, each of said lines being substantially parallel to each other,
the first and second pair of bearing means defining the corners of the display area,
a flexible tension member movably disposed on said bearing means in said first and second pairs,
only a first portion of said tension member extending between the bearing means in said first pair of bearing means substantially parallel to the first side of said display area,
at least a second portion of said tension member extending from a bearing means on one end of said first pair of bearing means to a bearing means on the opposite end of said second pair of bearing means,
only a third portion of said tension member extending from the bearing means on one end of said first pair to the bearing means at the opposite end in said second pair, and
an indicator disposed across said display area, said indicator having the opposite ends thereof secured to said first and third portions for movement with said tension member.

12. In combination for translating an indicator across a display area,
a first pair of bearing means disposed in a line extending along one side of said display area,
a second pair of bearing means disposed in a second line extending along an opposite side of said display area, each of said lines being substantially parallel to each other,
a flexible tension member movably disposed on said bearing means in said first and second pairs,
only a first portion of said tension member extending between the bearing means in said first pair of bearing means substantially parallel to said first side of said display area,
at least a second portion of said tension member extending across the display area from a bearing means on one end of said first pair of bearing means to a bearing means on the opposite end of said second pair of bearing means,
only a third portion of said tension member extending from the bearing means on said opposite end of said second pair to the other bearing means in said second pair,
drive means operatively interconnected with said tension member for moving said tension member around said bearing means with said first and said third portions moving in the same directions and parallel to each other, and
an indicator secured to said first and third portions of said tension member for movement with said tension means.

13. In combination for simultaneously translating a pair of indicators across a display area defined by four corners,
four bearing means disposed in a quadrilateral configuration and adjacent the four corners of said display area,
a flexible tension member movably disposed on said four bearing means,
the first portion of said tension member extending between only a first and second of the four bearing means and along one side of said display area,
at least a second portion of said tension member extending from the first portion of said bearing means at one corner of said display area to a third one of the four bearing means at the diagonally opposite corner of said display area,
only a third portion of said tension member extending from said diagonally opposite corner and said third bearing means to the fourth one of the bearing means along a line substantially parallel to said first portion to move in the same direction as said first portion,
only a fourth portion of said tension member extending from said fourth bearing means to the first of the bearing means,
only a fifth portion of said tension member extending from said first bearing means to said third bearing means, and only a sixth portion of said tension member extending from said third bearing means to said second bearing means along a line substantially parallel to said fourth portion.

14. In combination for translating a pair of indicators across a display area having a substantially rectangular configuration defined by four corners,
support means,
four bearing means secured to said support means adjacent the four corners of said display area in a rectangular configuration,
a flexible tension member movably disposed on said four bearing means,
only a first portion of said tension member extending between first and second ones of the bearing means and along one side of said display area,
at least a second portion of said tension member extending from the first of said bearing means at one corner of said display area to a third one of the bearing means at the diagonally opposite corner of said display area, a third portion of said tension member extending from said diagonally opposite corner and said third bearing means to the fourth one of the bearing means along a line substantially parallel to said first portion to move in the same direction as said first portion, only a fourth portion of said tension member extending from said fourth bearing means to the first of the bearing means, only a fifth portion of said tension member extending from said first bearing means to said third bearing means, only a sixth portion of said tension member extending from said third bearing means to said second bearing means along a line substantially parallel to said fourth portion so as to move in the same direction as said fourth portion, a first indicator connected to said first and third portions of said tension member for movement with said first and third portions of said tension member in translation across said display area, and a second indicator connected to said fourth and sixth portions of said tension member at substantially right angles to said first indicator for movement with said first and third portions of said tension member in translation across said display area.

15. In combination for translating an indicator across a display area, support means having a substantially rectangular display area defined by four corners, four bearing means secured to said support means respectively adjacent the four corners of said display area in a rectangular configuration, an endless flexible tension member movably disposed around said four bearing means, drive means operatively connected to said tension member for driving said tension member around said bearing means, only a first portion of said tension member extending between first and second ones of the four bearing means and, at least a second portion of said tension member extending from the first one of said four bearing means at one corner of said display area to a third one of the four bearing means at the diagonally opposite corner of said display area, only a third portion of said tension member extending from said diagonally opposite corner and said third bearing means to the fourth one of the bearing means along a line substantially parallel to said first portion to move in the same direction as said first portion, only a fourth portion of said tension member extending from said fourth bearing means to the first of the bearing means, only a fifth portion of said tension member extending from said first bearing means to said third bearing means, only a sixth portion of said tension member extending from said third bearing means to said second bearing means along a line substantially parallel to said fourth portion so as to move in the same direction as said fourth portion, a first indicator connected to said first and third portions of said tension member for movement with said first and third portions of said tension member in translation across said display area as said drive means move said tension member around said bearing means, a second indicator connected to said fourth and sixth portions of said tension member at substantially right angles to said first indicator so as to cross said first indicator in alignment with said display area, said fourth and sixth portions of said tension member being effective to carry said second indicator in translation across said display area, and a ring member slidably disposed upon said first and second indicators concentrically about the position where said first and second indicators cross each other.

16. Indicator means of the class described, including the combination of:

a rectangular display area having first and second perpendicular sides and third and fourth perpendicular sides respectively parallel to the first and second perpendicular sides, there being a first array of indicia extending along the first side of said display area, there being a second array of indicia extending along the second side of said display area, a first indicator positioned adjacent said first array of indicia and extending across said display area to register with the individual indicia in said first array, a second indicator positioned adjacent said second array of indicia and extending across said display area to register with the individual indicia in said second array, a flexible tension member extending around said display area and having first and second portions disposed in substantially parallel relationship and interconnected with the opposite ends of said first indicator for carrying said indicator in translation across said display area and along the indicia in the first array, said tension member including third and fourth portions interconnected with the opposite ends of said second indicator for carrying said indicator and disposed in substantially parallel relationship in translation across said display area and along the indicia in the second array, said tension member including a fifth portion extending diagonally across the display area between a position common to the first and second perpendicular sides and a position common to the third and fourth perpendicular sides, and manually actuatable drive means interconnected with said tension member for moving said tension member to simultaneously translate both of said indicators across said display area along a diagonal between a position common to the second and third perpendicular sides and the position common to the first and fourth perpendicular sides.

17. Indicator means of the class described for indicating a first function or a second function different from the first function, including the combination of:

a rectangular display area having first and second parallel sides and third and fourth sides perpendicular to the first and second sides, there being a row of indicia extending along the first side of said area, each of the indicia in said row being positioned to represent an individual value in the first function, there being a column of indicia extending along the third side of said area, each of the indicia in said column being positioned to represent an individual value in the second function, first, second, third and fourth bearing means respectively disposed adjacent different corners of said display area, an endless tension member disposed on said bearing means, said tension member having a first portion extending along the first side of said display area between the first and second bearing means, a second portion extending along the third side of said display area between the second and third bearing means, a third portion extending diagonally across said display area between said third and first bearing means, a fourth portion extending along the fourth side of said display area between said first bearing means and the fourth bearing means and a fifth portion extending between said fourth bearing means and said third bearing means and a sixth portion extending diagonally across said display area between said first and third bearing means, a first indicator having opposite ends secured to said first and fifth portions to extend across said display area to register with the individual indicia in said row, said first and fifth portions being effective to move both ends of said indicator across said display area in the same direction through equal increments of distance, a second indicator having opposite ends secured to said second and fourth portions to extend across said display area to register with the individual indicia in said column, said second and fourth portions being effective to move both ends of said indicator across said display area in the same direction through equal increments of distance, and means operatively interconnected with said tension member for moving said tension member around said bearing means for simultaneously translating both of said indicators across said display area.

18. Indicator means of the class described comprising the combination of:
a display area having first and second sides transversely disposed relative to each other,
there being a row of indicia extending across said display area along said first side,
a first indicator mounted adjacent said display area, said first indicator including an elongated light transmission portion positioned to register with the individual indicia in said row,
there being a column of indicia extending along the second side of said display area,
a second indicator mounted adjacent said display area, said indicator including an elongated light transmission portion positioned to register with the individual indicia in said column,
first light means operatively coupled to the first indicator to couple light into the light transmission portion of said first indicator to obtain the production of a first luminous line adjacent the indicia in said row,
second light means operatively coupled to the second indicator to couple light into the light transmission portion of said second indicator to obtain the production of a second luminous line across the indicia in said column,
means operatively coupled to the first and second light means for selectively energizing the first and second light means to select the row or column of indicia for indication, and
means operatively coupled to the first and second indicators for synchronously driving the first and second indicators respectively along the row of indicia and column of indicia.

19. Indicator means of the class described for indicating a first function or a second function different from the first function comprising the combination of:
a display area having first and second sides transversely disposed relative to each other,
there being a row of indicia extending along the first side of said display area, each of the indicia in said row being positioned to represent the value in a first function,
a first indicator mounted adjacent said display area, said first indicator including an elongated light transmission portion positioned to register with the individual indicia in said row and to extend across said display area,
there being a column of indicia extending along the second side of said display area, each of the indicia in said column being positioned to represent a value in the second function,
a second indicator mounted adjacent said display area in transverse relationship to said first indicator, said second indicator including a second light transmission portion positioned to register with the individual indicia in said column and to extend across said display area,
drive means operatively interconnected with said first and second indicators for synchronously moving said first and second indicators respectively along said indicia in said row and column to indicate the values of said first and second functions,
a first light means effective to couple light into the light transmission portion of said first indicator to obtain the production of a luminous indication as to the position of the first indicator relative to the indicia in the row,
second light means effective to couple light into the light transmission portion of said second indicator to obtain the production of a luminous indication as to the position of the second indicator relative to the indicia in the column, and
means operative to selectively energize only a particular one of said first light means and said second light means at each instant.

20. Indicator means of the class described, including the combination of:
light transmission means for carrying light therethrough and having first and second sides disposed in transverse relationship to each other,
first means operatively coupled to the light transmission means to energize said light transmission means for causing light to travel through the first side of the light transmission means in a first mode,
second means operatively coupled to the light transmission means to energize said light transmission means for causing light to travel through the second side of said transmission means in a second mode,
a first array of indicia disposed along the first side of said light transmission means for providing indications in accordance with the radiation of light from said transmission means, said indicia being arranged to be coupled only to light from said light transmission means when energized in said first mode,
a second array of indicia on said light transmission means for providing indications in accordance with the radiation of light from said transmission means, said indicia being arranged to be coupled only to light from said light transmission means when said light transmission means is energized in said second mode,
a first indicator extending across said light transmission means to a position contiguous to the indicia in the first array for indicating the indicia in the first array,
a second indicator extending across said light transmission means to a position contiguous to the indicia in the second array for indicating the indicia in the second array,
third means operatively coupled to the first and second indicators for obtaining synchronous movements of the first indicator along the indicia of the first arrays and of the second indicator along the indicia of the second array, and
means operatively coupled to the first and second means for selectively obtaining an operation of individual ones of the first and second means at different times to provide an illumination of individual ones of the first and second arrays of indicia.

21. Indicator means of the class described for indicating a first function or a second function different from the first function, including the combination of:
light transmission means for carrying light therethrough and having first and second sides disposed in transverse relationship to each other,
first means operatively coupled to the light transmission means to energize said light transmission means for causing light to travel through the first side of said light transmission means in a first mode, second means operatively coupled to the light transmission means to energize said light transmission means for causing light to travel through the second side of said transmission means in a second mode, there being a first array of indicia along the first side of said light transmission means, each of the indicia in said array being positioned to represent the individual values in the first function, there being a second array of indicia along the second side of said light transmission means, each of the indicia in said array being positioned to represent the individual values in the second function, first indicator means disposed relative to said light transmission means to register with the indicia in said first array to indicate the value of said first function, second indicator means disposed relative to said light transmission means to register with the indicia in said second array to indicate the value of said second function, third means operatively coupled to said first and second means to energize only said first means at particular times and said second means at other times, and drive means coupled to said first and second indicator means for synchronously driving the first indicator means along the indicia in the first array and the second indicator means along the indicia in the second array.

22. Indicator means of the class described, including the combination of:

a first light transmission member for passing light and having a particular side, a second light transmission member disposed adjacent said first light transmission means for passing light and having a particular side disposed in transverse relationship to the particular side of the first light transmission member, said first and second light transmission members being isolated from each other whereby the light in each one of said first and second members will be isolated from the other of said members, first means operatively coupled to the first light transmission member to direct light into said first light transmission member for passage through the member, second means operatively coupled to the second light transmission member to direct light into said second light transmission member for passage through the member, there being a first array of indicia disposed along the particular side of said first light transmission member, there being a second array of indicia disposed along the particular side of said second light transmission member, means operatively coupled to the first and second means to alternatively energize said first and second means to obtain a passage of light by an individual one of the first and second members, a first indicator disposed relative to the indicia in the first array to indicate such indicia and movable along such indicia, a second indicator disposed relative to the indicia in the second array to indicate such indicia and movable along such indicia, and means operatively coupled to the first and second indicators for synchronously moving the first indicator along the indicia in the first array and the second indicator along the indicia in the second array.

23. Indicator means of the class described, comprising the combination of:

a first triangular light transmission member for passing light through the member and having a hypotenuse and a particular side, a second triangular light transmission member for passing light through the member and having a hypotenuse and a particular side, said first and second members having their hypotenuses disposed adjacent each other to form a substantially rectangular shape and having their particular sides disposed in transverse relationship to each other, said first and second light transmission members being optically isolated from each other whereby the diffused light in one of said members will be isolated from the other of said members, a first light source disposed relative to the first light transmission member to direct light into said first triangular member for passage through the member, a second light source disposed relative to the second light transmission member to direct light into said second triangular member for passage through the member, there being a first array of indicia disposed along the particular side of said first triangular member, each of the indicia in said array being positioned to represent the individual values in a first function, there being a second array of indicia disposed along the particular side of said second triangular member, each of the indicia in said second array being positioned to represent the individual values in a second function, a first indicator disposed relative to said triangular members in contiguous relationship to the indicia in said first array for moving across said members and along said indicia to register with the indicia to indicate the value of said first function, a second indicator disposed relative to said triangular members in contiguous relationship to the indicia in said second array for moving across said members and along said indicia to register with the indicia in said second array to indicate the value of said second function, means operatively coupled to said first and second light sources to selectively energize said first light source at first particular times to cause said first array to indicate the value of said first function and to energize said second light source at second particular times different from said first particular times to cause said second array to indicate the value of said second function, and means including a tension member operatively coupled to the first and second indicators for synchronously moving the first indicator along the indicia in the first array and the second indicator along the indicia in the second array.

24. Indicator means of the class described, including the combination of:

a first substantially planar member, said member including a transparent material for passing light, said first member having a particular side, a second substantially planar member disposed in substantial alignment with said first member, said second member including a transparent material for passing light, said second member having a particular side, said first and second members being disposed in substantial alignment with each other to make one member visible through the other member, said members being optically isolated from each other whereby the diffused light in one of said members will be isolated from the other of said members, said members being disposed with the particular sides of the first and second members in transverse relationship to each other, a first light source disposed relative to said first member to direct light into said first member for passage through the member, a second light source disposed relative to said second member to direct light into said second member for passage through the member, there being a first array of indicia disposed along the particular side of said first member, each of the indicia in said array being positioned to represent the individual values in a first function, there being a second array of indicia disposed along the particular side of said second member, each of the indicia in said second array being positioned to represent the individual values in a second function, a first indicator disposed relative to said members and in contiguous relationship to the indicia in said first array for moving across said members to register with the indicia in said first array to indicate the value of said first function, a second indicator disposed relative to said members and in contiguous relationship to the indicia in said second array for moving across said members to register with the indicia in said second array to indicate the value of said second function, means operatively coupled to said first and second light sources to energize said first light source at first particular times to cause said first array to indicate the value of said first function and to energize said second light source at second particular times different from the first particular times to cause said second array to indicate the value of said second function, and means operatively coupled to said first and second indicators for synchronously moving the first indicator along the indicia of the first array and the second indicator along the indicia of the second array.

25. Indicator means of the class described, including the combination of:

a display area having first and second sides in transverse relationship to each other, there being a row of indicia extending along the first side of the display area, there being a column of indicia extending along the second side of the display area, a first indicator disposed relative to the display area to register with the individual indicia in the row and movable along the row, a second indicator disposed relative to the display area to register with the individual indicia in the column and movable along the column, drive means operatively connected with the first and second indicators for synchronously moving the first indicator along the row and the second indicator along the column, and means disposed relative to the display area and the indicator for selectively providing an illumination of the position at each instant of a particular one of the first and second indicators relative to the associated indicia in the rows and columns.

26. Indicator means of the class described, including the combination of:

indicating means including a first array of indicia disposed in a first direction and including a second array of indicia disposed in a second direction transverse to the first direction, a first indicator positioned adjacent the indicia in the first array in a direction transverse to the first array to register only with the individual indicia in the first array and movable along the first array, a second indicator positioned adjacent the indicia in the second array in a direction transverse to the second array to register only with the individual indicia in the second array and movable along the second array, means operatively interconnected with the first and second indicators for simultaneously moving the first indicator along the first array and the second indicator along the second array on a controlled basis, first means for providing an illumination as to the position of the first indicator relative to the indicia in the first array, second means for providing an illumination as to the position of the second indicator relative to the indicia in the second array, and means operatively coupled to the first and second illuminating means for selectively energizing an individual one of the first and second illuminating means at each instant.

27. Indicator means of the class described, including the combination of:

a display area having first and second sides disposed in transverse relationship to each other and having third and fourth sides respectively in substantially parallel relationship to the first and second sides, there being a row of indicia extending along the first side of the display area, each of the indicia in the row being positioned to represent individual values in a first function, there being a column of indicia extending along the second side of the display area, each of the indicia in the column being positioned to represent individual values in a second function different from the first function, a first illuminated indicator extending across the display area between the first and third sides and in contiguous relationship to the indicia in the row, means secured to the ends of the indicator adjacent the first and third sides to movably support the indicator for translation across the display area in a direction to register with the indicia in the row, a second illuminated indicator extending across the display area between the second and fourth sides and in contiguous relationship to the indicia in the column, means secured to the ends of the second indicator adjacent the second and fourth sides to movably support the second indicator for translation across the display area in a direction to register with the indicia in the column, first illuminating means for providing an illumination of the position of the first indicator relative to the indicia in the row, second illuminating means for providing an illumination of the position of the second indicator relative to the indicia in the column, means operatively coupled to the first and second illuminated means for selectively energizing the first illuminating means at first particular periods of time and for selectively energizing the second illuminating means at second particular periods of time different from the first particular periods of time, and drive means operatively interconnected with the first and second indicators for synchronously moving the first indicator in a direction to register with the indicia in the row and the second indicator in a direction to register with the indicia in the column to obtain a crossing of the indicators in substantial alignment with the diagonal line extending across the display area between the intersection of the first and second lines and the intersection of the third and fourth lines.

References Cited

UNITED STATES PATENTS

| | | | |
|---|---|---|---|
| 2,443,745 | 6/1940 | Montgomer | 116—124.1 |
| 2,367,577 | 1/1945 | Hayward | 40—130 |
| 2,507,027 | 5/1950 | Leeuwin | 116—124.1 |
| 2,573,803 | 11/1951 | Nash | 235—61 |
| 2,630,716 | 3/1953 | Depiveg | 74—10.7 |
| 2,847,859 | 8/1958 | Lynott | 33—1 |
| 2,891,314 | 6/1959 | Haschek | 33—1 |

(Other references on following page)

UNITED STATES PATENTS

| | | | |
|---|---|---|---|
| 2,963,791 | 12/1960 | Wolfle | 33—125 |
| 3,003,357 | 10/1961 | Votta | 74—95 |
| 3,044,312 | 7/1962 | Hall et al. | 74—95 |
| 3,055,113 | 9/1962 | Grandjean | 33—18 |
| 3,078,036 | 2/1963 | Case | 285—61 |

FOREIGN PATENTS

| | | |
|---|---|---|
| 169,890 | 12/1951 | Australia. |
| 679,976 | 1/1930 | France. |
| 982,451 | 1/1951 | France. |

LOUIS J. CAPOZI, *Primary Examiner*.